Patented Feb. 21, 1928.

1,660,178

UNITED STATES PATENT OFFICE.

ALBERT ROTHMANN, OF HEIDELBERG, AND VALENTIN HILCKEN, OF GERSTHOFEN, NEAR AUGSBURG, GERMANY, ASSIGNORS TO C. F. BOEHRINGER & SOEHNE G. M. B. H., OF MANNHEIM-WALDHOF, GERMANY.

DERIVATIVE OF CINCHONA ALKALOIDS AND MAKING SAME.

No Drawing. Application filed September 5, 1925, Serial No. 54,798, and in Germany September 8, 1924.

It is well-known that, when reacting on cyclic carbon compounds containing nitrogen with a cyanogen haloid, products of the most diversified character are obtained. Thus, for example, in some cases a splitting up of the benzene-ring was observed (see Berichte der deutschen Chemischen Gesellschaft vol. 40 (1907), p. 3914; vol. 42 (1909), p. 2035; vol. 43 (1910) p. 1353); in others an aggregation of a cyanogen haloid compound with the cyclic compound (see Berichte der deutschen chem. Gesellschaft vol. 33 (1900), p. 1438; vol. 47 (1914), p. 761); and in another case the splitting off of a methyl-group bound to nitrogen, as described in German Patent No. 286,743.

In view of this situation it was impossible to predict what the result of reacting with cyanogen haloid on compounds of such complicated structure as the bases of cinchona would be. In view of the manifold possibilities of the reaction it was a fair supposition that the molecule of the cinchona-alkaloid would be attacked in various directions and at various points.

It was therefore a surprising discovery on the part of the inventors, that by reacting on these cinchona bases with a cyanogen haloid compound in the presence of an organic solvent, addition-products of both are invariably and readily produced with excellent yield and to the exclusion of all collateral reactions, which addition-products can be converted into the free cyanogen-bases by an alkali.

The new N-cyanogen compounds and derivatives of cinchona-bases serve as pharmacal compounds and may also serve as intermediate products for the manufacture of various pharmaceutical preparations and compounds.

In the following examples we have described the preferred manner of carrying our invention into practice.

Example 1.—Quinine-cyanide.

50 grams of quinine are dissolved in 75 cubic centimeters of alcohol and a solution of 16.3 grams of cyanogen bromid in 50 cubic centimeters of alcohol is added thereto while cooling with ice and stirring. Considerable heat is evolved in the liquid. On cooling crystallization soon sets in and after a short time the whole will have stiffened to a crystalline magma. The supernatant liquid is removed by suction or siphoning and the residue is washed with ether on the filter. By adding ether to the filtrate, still further quantities of the resultant addition product are obtained. This product crystallizes in white needles which soften at 94°, centigrade. It is readily soluble in water, soluble with difficulty in alcohol and insoluble in ether, benzene and chloroform. An aqueous solution of the same will not give the thalleio-quinine reaction.

The free base is obtained by dissolving the product so formed in water with a small addition of dilute hydrochloric acid and carefully adding aqueous ammonia. Thereby quinine-cyanide is separated in the form of fine crystals which are freed from the supernatant liquid and then washed with water. After drying, the product is recrystallized from hot aqueous methyl-alcohol. This new compound is readily soluble in hot alcohol and in chloroform, and soluble with difficulty in ether. It melts at 225 to 226°, centigrade and its composition corresponds to the formula $C_{21}H_{24}O_2N_3$ (percentage of N calculated to be 12%; actually found 12.36%.)

The hydrochlorids obtained from quinine-cyanide according to usual methods forms a white crystalline powder. It is readily soluble in water, soluble with difficulty in alcohol, and insoluble in ether, benzene and chloroform.

Example 2.—Hydroquinine-cyanide.

50 grams of hydroquinine are reacted on with 16.3 grams of cyanogen-bromid in alcoholic solution, as in Example 1. The resultant cyanogen-bromid-addition-product, which is precipitated is separated from the supernatant-liquid by suction and washed with ether. This substance, when heated in a melting-point test-tube assumes a yellow color at 110°, centigrade, and melts with brown coloration and decomposition at 165°, centigrade. It is readily soluble in water and acids, soluble with difficulty in alcohol, and insoluble in ether and benzene. Dissolved in dilute sulfuric acid it gives rise to greenish-blue fluorescence. It does not respond to the thalleio-quinine test.

To convert this product into hydroquinine cyanide, it is dissolved in water with the addition of a small amount of dilute hydrochloric acid, ether being then poured over the solution which is thereupon rendered weakly alkaline with aqueous ammonia. By vigorously shaking, the new base separates as a fine crystalline precipitate from which the supernatant liquor is removed by suction or in any appropriate and known manner. It is then washed with water and dried. By recrystallizing same from hot aqueous methyl-alcohol, the hydroquinine cyanid is obtained in the form of fine white and shining scales or lamellar crystals which melt at 223°, centigrade. This new compound has the composition corresponding to the formula, $C_{21}H_{26}O_2N_3$ (the computed amount of N being 11.95%, that found 12.34%). It is readily soluble in alcohol and chloroform and soluble with difficulty in ether and benzene.

An aqueous solution of the hydrochloride of this new compound responds to the thalleio-quinine test.

Example 3.—Cinchonidin-cyanide.

60 grams of cinchonidin are dissolved in 800 cubic centimeters of anhydrous ethyl-alcohol and a solution of 22 grams of cyanogen bromid in 50 cubic centimeters of alcohol added thereto. The entire solution is heated to about 60°, centigrade, for a brief time on the water-bath, until it has assumed a wine-yellow color. It is then ice-cooled, whereby the cyanogen-bromid-addition-product crystallizes out of the solution. The supernatant liquid is then removed by suction and the residue is washed on the filter and dried. From the filtrate further amounts of the crystalline compound are separated with ether. This salt is readily soluble in water, soluble with difficulty in alcohol and chloroform, and insoluble in ether.

By adding aqueous ammonia to an aqueous solution of the salt, the base separates as a white amorphous mass. This base is readily soluble in alcohol and soluble with difficulty in acetone and acetic ether (ethyl acetate), and almost insoluble in ether. It is precipitated as a gelatinous mass from its solution. Its melting point is 195° centigrade and its composition corresponds to the formula $C_{20}H_{22}ON_3$ (content of N found to be 13.4%, the computed value being 13.12%).

The hydrochloride prepared from the base forms a white crystalline powder which dissolves readily in water and less readily in dilute hydrochloric acid.

Example 4.—Hydro-cuprein-cyanide.

31 grams of hydrocuprein are brought into reaction with 11 grams of cyanogen-bromid in alcoholic solution according to the directions given under Example 1. Thereby a considerable rise of temperature is developed in the solution. It is heated to 60°, centigrade, for a brief period (about 10 minutes) on the water bath. Upon cooling the new addition-product separates by adding to the solution several times its volume of ether. The supernatant liquid is removed by suction and the residue is quickly dried, since the salt readily deliquesces in the air. The salt should be promptly dissolved in water to which are added several cubic centimeters of dilute hydrochloric acid, whereupon the free base is precipitated with aqueous ammonia. This new base melts with decomposition at 215°, centigrade. It is readily soluble in a solution of caustic soda as well as in alcohol and chloroform, soluble with difficulty in ethyl-acetate and acetone, and insoluble in ether and benzene. It is yellowish in color, and, when dissolved in the above organic solvents presents a deep wine-red color. Its composition is expressed in the formula, $C_{20}H_{24}O_2N_3$ (computed content in N; 12.42%, found 12.62%). The chloride of this base is obtained in the form of a pale yellow powder which is readily soluble in water.

It will be noted from the above examples that both the haloid compound obtained by this process and the base obtained therefrom are distinguished by non-acid properties and their solubility in alcohol. It will also be observed that these products are nitriles in structure.

What we claim and desire to secure by Letters Patent is:

1. The process of preparing a cyanogen derivative of a cinchona base, which consists in reacting on a cinchona base together with an organic solvent with a cyanogen-haloid compound.

2. The process of preparing a cyanogen derivative of a cinchona base, which consists in reacting on a cinchona base together with an organic solvent with a cyanogen haloid compound and isolating the free base from the product so obtained by reacting thereon with an alkali.

3. The process which consists in reacting on quinine together with an organic solvent with cyanogen bromid.

4. The process which consists in reacting on quinine together with an organic solvent with cyanogen bromid and acting on the resultant bromo-addition product with alkali.

5. The process which consists in reacting on quinine dissolved in an organic solvent with cyanogen bromid, and acting on the resultant product with aqueous ammonia.

6. As a new chemical product, a cyanogen compound of nitrile structure of a cinchona base having non-acid properties and being soluble in alcohol.

7. As a new chemical product a cyanogen-compound of nitrile structure of quinine having non-acid properties and being soluble in alcohol.

In testimony whereof we hereunto affix our signatures.

ALBERT ROTHMANN.
VALENTIN HILCKEN.